(12) United States Patent
Dugan et al.

(10) Patent No.: US 9,705,607 B2
(45) Date of Patent: Jul. 11, 2017

(54) SYSTEM AND METHODS OF ACOUSTIC MONITORING

(71) Applicant: Cornell University, Ithaca, NY (US)

(72) Inventors: Peter J. Dugan, Ithaca, NY (US); Dimitri W. Ponirakis, Dryden, NY (US); Michael S. Pitzrick, Ithaca, NY (US); John A. Zollweg, Ithaca, NY (US); Christopher W. Clark, Ithaca, NY (US); Aaron N. Rice, Ithaca, NY (US)

(73) Assignee: Cornell University, Ithaca, NY (US)

( * ) Notice: Subject to any disclaimer, the term of this patent is extended or adjusted under 35 U.S.C. 154(b) by 491 days.

(21) Appl. No.: 14/349,459

(22) PCT Filed: Oct. 3, 2012

(86) PCT No.: PCT/US2012/058565
§ 371 (c)(1),
(2) Date: Apr. 3, 2014

(87) PCT Pub. No.: WO2013/052549
PCT Pub. Date: Apr. 11, 2013

(65) Prior Publication Data
US 2014/0269202 A1 Sep. 18, 2014

Related U.S. Application Data

(60) Provisional application No. 61/542,636, filed on Oct. 3, 2011.

(51) Int. Cl.
*H04B 13/00* (2006.01)
*G01S 15/00* (2006.01)
*H04B 13/02* (2006.01)
*A01K 29/00* (2006.01)

(52) U.S. Cl.
CPC .......... *H04B 13/02* (2013.01); *A01K 29/005* (2013.01)

(58) Field of Classification Search
USPC .......................................... 367/13
See application file for complete search history.

(56) References Cited

U.S. PATENT DOCUMENTS

| 5,410,519 A * | 4/1995 | Hall et al. ..................... 367/127 |
| 7,495,994 B2 * | 2/2009 | Makris et al. ................... 367/11 |
| 7,974,151 B2 * | 7/2011 | Iranpour et al. ................ 367/15 |
| 8,094,874 B2 * | 1/2012 | Dugan et al. ................. 382/100 |

(Continued)

OTHER PUBLICATIONS

Boyd et al. Effects of Sound Exposure on the Behaviour of Toothed Whales: Behavioral Response Study. University of St. Andrews, UK. May 27, 2010. <URL:http://web.archive.org/web/20100527150742/http://www.lib.noaa.gov/about/news/Southall_121808.pdf>.

(Continued)

*Primary Examiner* — James Hulka
(74) *Attorney, Agent, or Firm* — Valauskas Corder LLC (57) ABSTRACT

A high performance computing strategy along with the capability to integrate various layers of data within a modeling framework incorporates various tools such as ambient noise, vessel and animal data to measure acute and chronic noise levels, detect and classify marine mammal vocalizations, and compute various metrics such as receive levels, signal excess, masking and communication space over relatively large temporal and spatial scales.

19 Claims, 10 Drawing Sheets

(56) References Cited

U.S. PATENT DOCUMENTS

| | | | |
|---|---|---|---|
| 8,443,017 B2* | 5/2013 | Suzuki et al. | 708/200 |
| 2006/0280030 A1* | 12/2006 | Makris et al. | 367/11 |
| 2010/0067326 A1* | 3/2010 | Iranpour et al. | 367/20 |
| 2010/0098291 A1* | 4/2010 | Dugan et al. | 382/101 |
| 2010/0262639 A1* | 10/2010 | Suzuki et al. | 708/201 |

OTHER PUBLICATIONS

Hildebrand. Sources of Anthropogenic Sound in the Marine Environment. Scripps Institution of Oceanography. Sep. 22, 2008. <URL: http://wayback.archive.org/web/*/http://mmc.gov/sound/internationalwrkshp/pdf/hildebrand.pdf>.

Mellinger et al. An Overview of Fixed Passive Acoustic Observation Methods for Cetaceans. Oceanography. 2007. vol. 20, No. 4. <URL: http://www.tos.org/oceanography/archive/20-4_mellinger.pdf>.

* cited by examiner

SYSTEM AND METHODS OF ACOUSTIC MONITORING

CROSS-REFERENCE TO RELATED APPLICATIONS

This application claims priority to U.S. Provisional Application No. 61/542,636 filed Oct. 3, 2011, which is incorporated by reference in its entirety.

FIELD OF THE INVENTION

The invention relates generally to the effects of anthropogenic noise on various environments. More particularly, the present invention relates to a system and methods for analyzing acute and chronic noise levels in order to detect, classify, and model events to assess the impact of noise on environments including, for example, marine environments.

BACKGROUND OF THE INVENTION

Whales, dolphins and porpoises are difficult to detect visually from the water surface, but they produce a rich variety of underwater acoustic signals, which offer a means for detecting their presence and identifying them to species. In recent years, Passive Acoustic Monitoring ("PAM") has proven to be one of the most effective methods for determining species occurrence and distributions over various spatial and temporal scales. PAM is motivated by the need to estimate and evaluate the potential impacts of human noise generating activities on marine mammals, where impacts range from acute—such as auditory effects—to chronic—such as communication masking.

PAM methods have been applied to successfully detect various species, for example, baleen whale species in North American waters. However, there are several challenges to using PAM. First, understanding migratory patterns and seasonal behaviors requires the collection of long-term acoustic recordings. Second, background noise levels can vary significantly throughout the data collection period, increasing the difficulty of sound detection and classification analysis. Together, variable noise and enormous quantities of acoustic data become a formidable challenge for detecting species such as the highly endangered North Atlantic Right Whale. To optimize this process, automated signal processing—otherwise known as data mining methods—has been developed to accurately and precisely detect whales while accounting for variability in signal structure and background noise. In most cases, sound recognition algorithms analyze sound data after the recording devices are recovered from the water. New technologies have begun to incorporate signal recognition algorithms in a real-time system while devices are recording. In these different archival and real-time applications, signal processing methods are used to detect sounds of interest. Tools for successful PAM maximize the number of true whale detections while minimizing missed whale sounds and false positives. However, temporal and geographical fluctuations in ambient and anthropogenic noise levels can bias the detection process when using conventional tools.

Marine environments are being subjected to increasing levels of noise. To measure and understand the water's acoustic environment, both impulsive and chronic noise sources must be considered. Of particular interest are noise sources generated by seismic vessels and ship traffic. In order to understand acute and chronic impacts, several parameters are required, including noise measures, animal locations, sound characterization and environmental factors, such as ocean conditions and vessel location. To make informed decisions, information needs to be systematically processed in order to provide metrics for estimating chronic and acute sounds. To date, few software packages integrate all these parameters.

One method to measure sound exposure from acute sources is known as the Acoustic Integration Model ("AIM"). AIM works to model both stationary and mobile objects using actual track information or simulated information. However, recent trends in understanding noise go beyond acute sources and consider chronic impacts. Chronic impacts require understanding long-term trends in the environment, and engage a paradigm that considers signal excess and communication space as critical quantities for evaluating the influence of cumulative anthropogenic sound sources on the ability for marine mammals to communicate.

Therefore, there is a need to measure and quantify the communication space of animals. Specifically, there is a need to integrate a variety of data formats in a relatively short amount of time, provide advanced computing environments, and leverage existing tools, provide mechanisms to integrate various data layers, and produce situational models that describe the acoustic environment. The present invention satisfies this need.

SUMMARY

The present invention incorporates various tools to measure acute and chronic noise levels, detect and classify marine mammal vocalizations, and compute various metrics such as receive levels, signal excess, masking and communication space. A high performance computing strategy along with the capability to integrate various layers of data within a modeling framework incorporates ambient noise, vessel and animal data. Animated data visualization, and in particular animal, vessel, and ambient noise integrated over relatively large temporal and spatial scales, illustrates the importance of the present invention.

Although the present invention is discussed herein with respect to marine environments, any environment is contemplated such as atmospheric and land environments. An example of the applicability of the present invention to a land environment may relate to the exploration for fossil-fuel or alternative energy and the construction of facilities to support these endeavors, which often requires sizable construction efforts that usually require an impact study of noise on the environment. A variety of data is used to generate environmental impact reports, and there is extensive processing time required to generate the data from large amounts of passive acoustic recordings. Due to the success of acoustic monitoring, understanding acoustic signatures is now becoming part of environmental impact assessment and required compliance for permitting construction efforts.

The effects of anthropogenic noise on the marine environment are an important concern. For purposes of this application, the term "marine" refers to any environment involving water such as oceans, lakes, ponds, rivers, streams, bogs, etc.

The present invention measures and quantifies the communication space of an animal of a marine environment. The present invention facilitates the creation of a prototype environment that integrates a variety of data formats in a relatively short amount of time such as the development of a vessel database. The present invention also provides an advanced computing environment for basic tools such as noise analysis and detection/classification. The present invention may further leverage existing tools such as Acoustic Integration Model ("AIM"), Heat Light Sound ("HLS") Acoustic Toolbox and XBAT. Additionally, the present invention provides mechanisms to integrate the various data layers and produce situational models that describe the acoustic environment.

The present invention includes a collection of application-specific tools designed and implemented for environmental compliance. One advantage of the present invention is a parallel computing architecture designed to handle large amounts of data and rapid processing models for integrated noise analysis, species auto-detection, and other processes that interface to a MATLAB parallel processing environment. MATLAB is a high-level language and interactive environment for numerical computation, visualization, and programming to analyze data, develop algorithms, and create models and applications. MATLAB allows for rapid development especially with custom applications. Specifically, the present invention may use MATLAB with other tools that support detection, classification, localization, noise analysis, and acoustic modeling.

Another advantage is angular modeling for anthropogenic noise sources such as vessel traffic and methods to manage vessel dynamics and track information. Another advantage is integrated acoustic models, which interface to High Performance Computing ("HPC") engines for determining acoustic transmission loss.

The present invention further allows the visualization of results at specified latitude and longitude coordinates at various spatial and temporal scales of analysis. In addition, the present invention facilitates layer accumulation to determine chronic and acute measures as well as the ability to create models and acoustic animations.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION

At any geographical location, spatial-temporal data have the potential to provide information. For example, the existence of marine traffic, otherwise known as vessel tracking, causes higher background noise levels. For purposes of this application, the term "vessel" is any water craft such as a boat, ship, submarine, etc. Integrating this data into a common environment report provides more complete information about the acoustic environmental conditions. The present invention overlays the various layers of acoustic data to create integrated feature maps.

As the amount of data increases, the ability to process the data becomes an important aspect thereby leading to the creation of large-scale acoustic models. Furthermore, managing large amounts of information is desirable to solving problems at scale. Integration, management and the ability to visualize data are important aspects for understanding acoustic habitats when analyzing acoustic records.

The present invention can be considered a toolbox for use in a variety of applications, including noise analysis, detection-classification, and situation modeling. Processing data and going to large scales requires advanced computer methods such as the high performance computing architecture of the present invention. Results from the high performance computing indicate that a multi-node machine is advantageous for some processes, but not all and optimizing code is an important step in creating efficient processing applications.

Figure 1:
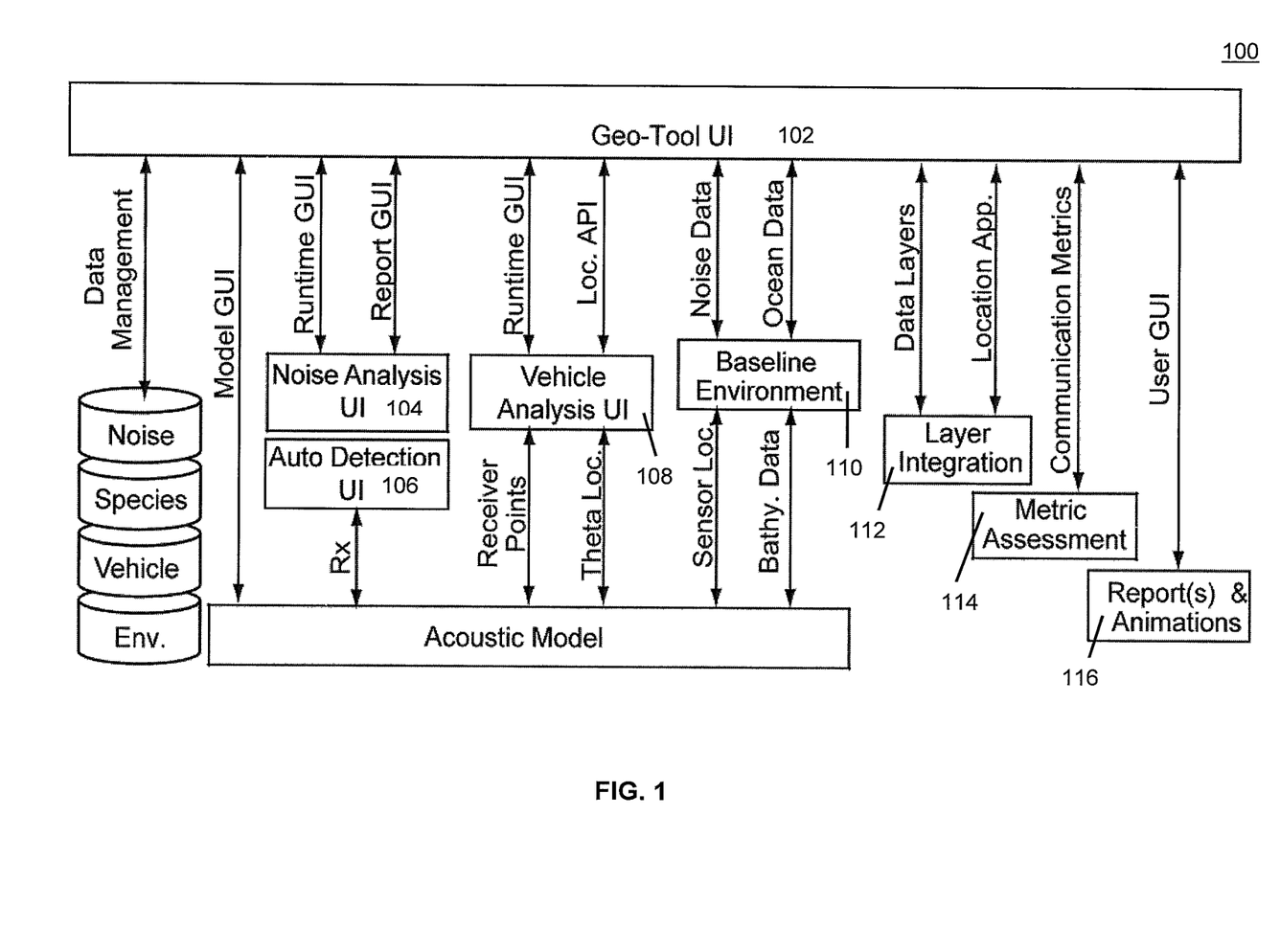
FIG. 1 illustrates an information layer architecture according to an embodiment of the present invention.

The information layer architecture 100 according to the present invention is shown in FIG. 1. A main graphical user interface 102 communicates with various subcomponents. Subcomponents include noise analysis 104, species auto-detection 106, vehicle analysis 108 and environmental data 110. Layer integration 112 and metric assessment 114 combine results to determine object location and communication metrics. Output is realized in the way of report information or animations including movies 116. The main objective of the architecture 100 in FIG. 1 is to provide an environment that allows for rapid prototyping, using a build and test phase.

Although typically high-level languages have slower execution speeds than lower level platforms like C/C++, MATLAB offers the ability to add and subtract components with relative ease. Advantages of the present invention include development time and access to third party tools and algorithms. Using a prototype language such as MATLAB allows for affordable changes in direction and is cost effective. To overcome slower execution speeds, the present invention may develop interfaces that use the MATLAB parallel processing toolbox. Proper construction of the software demonstrates fast, efficient execution times.

The main limiting factor for studying marine acoustic ecology using passive acoustic monitoring is the computer speed and processing capability. The computer and software serve as the backbone for providing data products and timely reporting. It is desirable to have a stable, fast processing platform to create data models. Since data processing already depends on many steps, less data handling and faster computational speeds are preferred for quantifying communication space and understand environmental impacts at ecologically meaningful scales. One of the greatest challenges with doing acoustic surveys is the ability to process vast amounts of data using efficient techniques. With the advent of new parallel computing strategies, users are able to process more data at geographically wider scales.

Figure 2:
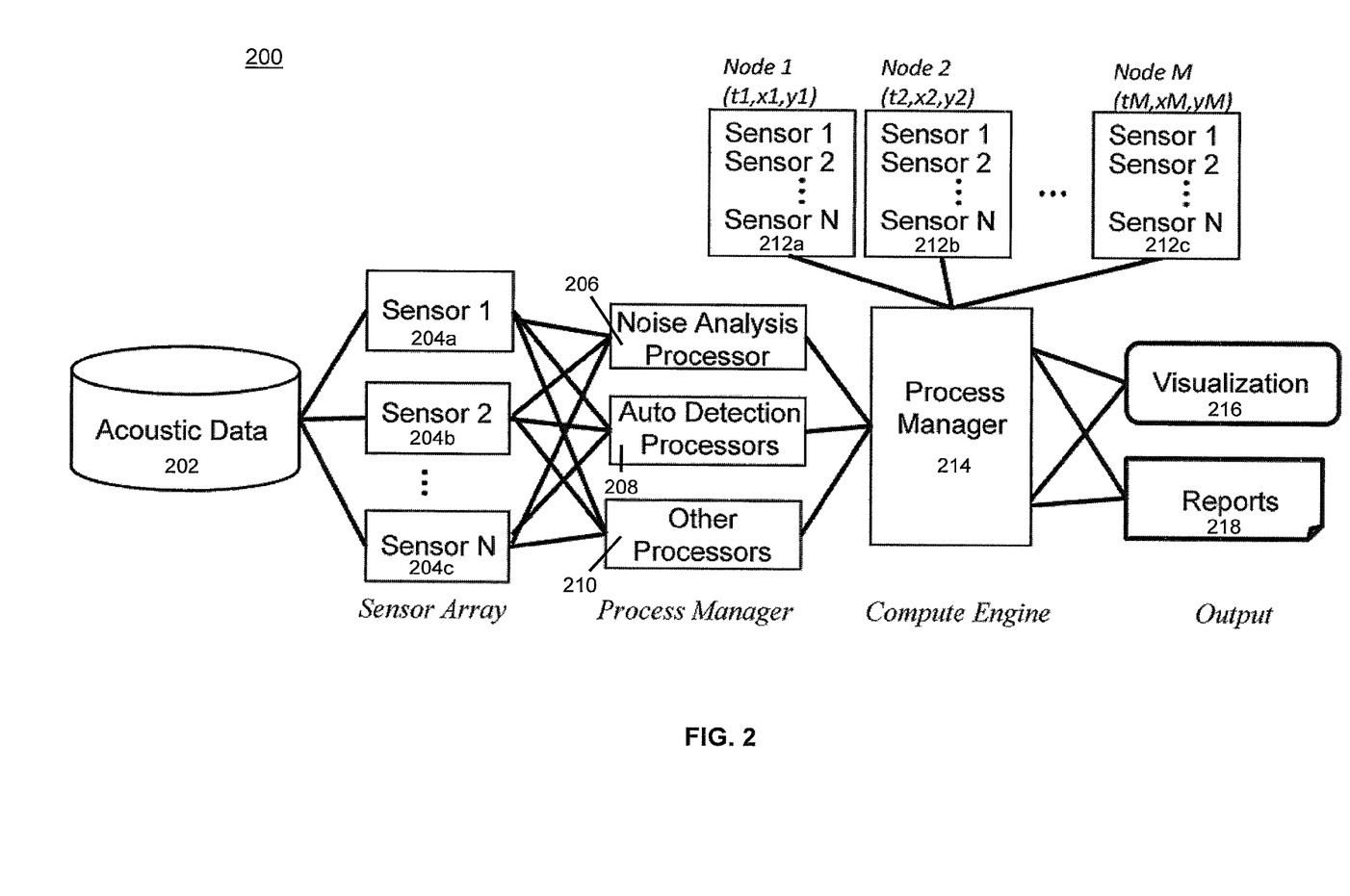
FIG. 2 illustrates a computing architecture according to one embodiment of the present invention.

FIG. 2 illustrates a computing architecture 200 according to one embodiment of the present invention. The computing architecture 200 implements high level processing for data taken from acoustic arrays and uses a parallel processing engine to optimize processing time. As shown in FIG. 2, simultaneous processing engines are utilized. As further shown in FIG. 2, a sensor array including multiple sensors 204a, 204b, 204c detect acoustic data 202 to provide data using a parallel structure. Downstream processing becomes more efficient by computing noise analysis 206 and auto-detection 208 in parallel. This processing ultimately allows for visualizations 216 and reports 218 to be rendered at near-real-time rates. Furthermore, animal trends, such as noise budgets (see FIG. 1) and call counts (see FIG. 4) can be viewed over wider, and therefore more biologically applicable, temporal scales.

More specifically, FIG. 2 shows one embodiment of the architecture 200 using a multi-channel audio input. Each channel is represented by N sensors 204a, 204b, 204c. Noise analysis 206 and auto-detection 208 is shown in FIG. 2 as two processes that use High Performance Computing ("HPC"), but it is contemplated that other tasks 210 can use HPC technology such as acoustic localization and acoustic modeling. Parallel processing is preferred to achieve high throughput processing performance. The process manager 214 divides the workload across M processing nodes 212a, 212b, 212c, and each node works either in temporal or spatial dimensions, depending on the task. After each process has finished, the final results are reassembled into a visual product 216 or report 218.

Two main processes that require advanced computing strategies are noise analysis 206 and event auto-detection 208. Noise analysis 206 is a deterministic process. The most common techniques use long-term spectrograms that depend on several factors including Fast Fourier Transform ("FFT") size, spectrogram overlap and the window type. Auto-detection analysis 208 detects acoustic events using automated software. In terms of processing performance, signal processing for auto-detection 208 is best described as non-deterministic. Rather, the speed of processing depends on many factors including the number of detections, complexity of the algorithms and the accuracy of the algorithms—more false positives require an increase in processing time. The challenge of processing both auto-detection 208 and noise analysis 206 tasks is that there is a very large dataset to process, with the size of the dataset determined by various factors including number of sensors, recording duration, sample rate, and bit depth.

A distributed network of sensors is required when trying to characterize a sound over a large area. For example, the number of sensors deployed in an array can be as high as 20 units. The recording duration pertains to the total time for which sensors record sound. For example, sensors can be deployed for a period of over 100 days of continuous recording. Sample rate relates to the number of samples per second at which the sensors are acquiring data. Generally, the sample rate is limited by the maximum frequency of the target species of interest. For example, a sample rate of 2 kHz is high enough to cover the range of vocalizations for Northern Atlantic Right Whales. Bit depth is the resolution at which the sensor determines the loudness of the sound. For example, certain Marine Autonomous Recording Units ("MARU") have a bit depth of 12. The bit depth also determines the dynamic range over which the sound can be measured. The dynamic range is the difference between the maximum value that can be recorded and the minimum value. For example, certain 12-bit sensors have a dynamic range of 64 dB.

To further illustrate the amount of data collected, processing data from 20 sensors for 100 days with a sample rate of 2 kHz generates 345,600,000,000 data points. Currently, computing power is not great enough to process this amount of data in one single process, so there is a requirement to divide the data into manageable portions and then save the data in files of a practical and manageable size for further analysis and visualization. How the data is divided up during system processing determines the duration and efficiency of the total analysis process. Various HPC methodologies can be employed to ensure that the data is processed in an optimal manner. The main possible dimensions for parallelization are sensor streams and time. The data from multiple sensors are multiplexed in the data files, so it is advantageous to process all sensor streams simultaneously to avoid multiple reads of the data. Thus, the system and methods of the invention have parallelization done in the time domain. At the beginning of the analysis, the time period to be analyzed is divided into a number of blocks that match the number of parallel processing units, and each block is assigned to a separate sensor unit. In this way, the parallel processing units operate independently until the analysis is completed. Then the results are gathered for output.

The present invention accommodates a variety of data sources. To model anthropogenic noise sources, an interface incorporates vessel traffic based on Global Positioning System ("GPS") coordinates. Combining the GPS coordinates of vessels along with the acoustic receive levels, angular response is computed as the vessel is moving through the water past the sensors. Equation (1) defines the general relationship used to record source levels for the angular response for individual vessels, and FIG. 3 illustrates the general relationship 300 of an object moving between points while being tracked by a sensor.

$$\theta_j = \cos^{-1} \frac{S_i^2 - (S_{i+1} - S_i)^2 - S_{i+1}^2}{-2(S_{i+1})(S_{i+1} - S_i)} \qquad \text{Equation (1)}$$

Figure 3:
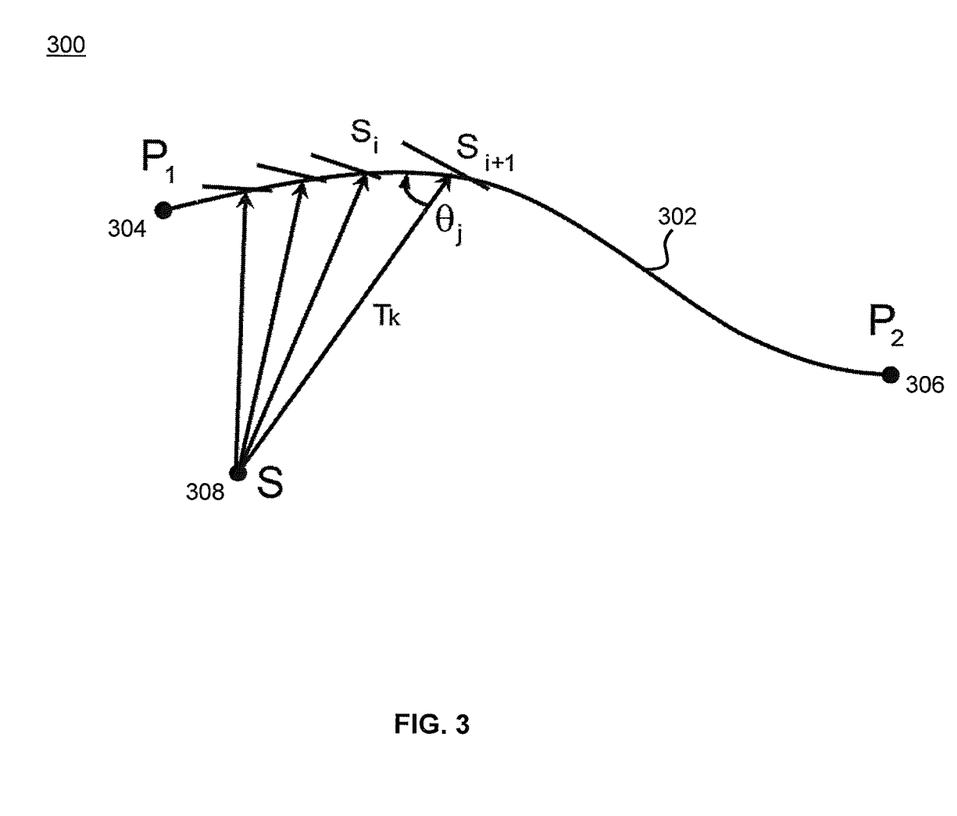
FIG. 3 illustrates a visual representation showing an object moving from point P1 to point P2 while be tracked by a sensor S according to one embodiment of the present invention.

As shown in FIG. 3, an object 302 moving from a first point (P$_1$) 304 to a second point (P$_2$) 306 passes and is tracked by a fixed sensor (S) 308 thereby providing a spatial measure of sound intensity as a function of received angle. These levels are captured for each known data track. Source levels as a function of bearing are recorded for each vessel and stored in a local database.

For each point along the track of the object 302, an angular value is determined using the relationship shown. At each point, the source provides a receive level, by factoring in the transmission loss Tk, the object response is computed as a function of θj. The relation in FIG. 3 assumes that known coordinates exist for the vessel. Also, the vessel specifications such as tonnage, size, engine type are known and incorporated into the local database along with the acoustic data. As the vessel travels from the first point (P$_1$) 304 to the second point (P$_2$) 306, sensor (S) 308 records acoustic levels (in dB, re 1 μPa). At each known location, transmission loss Tk, is computed using an acoustic modeling package.

Figure 4:
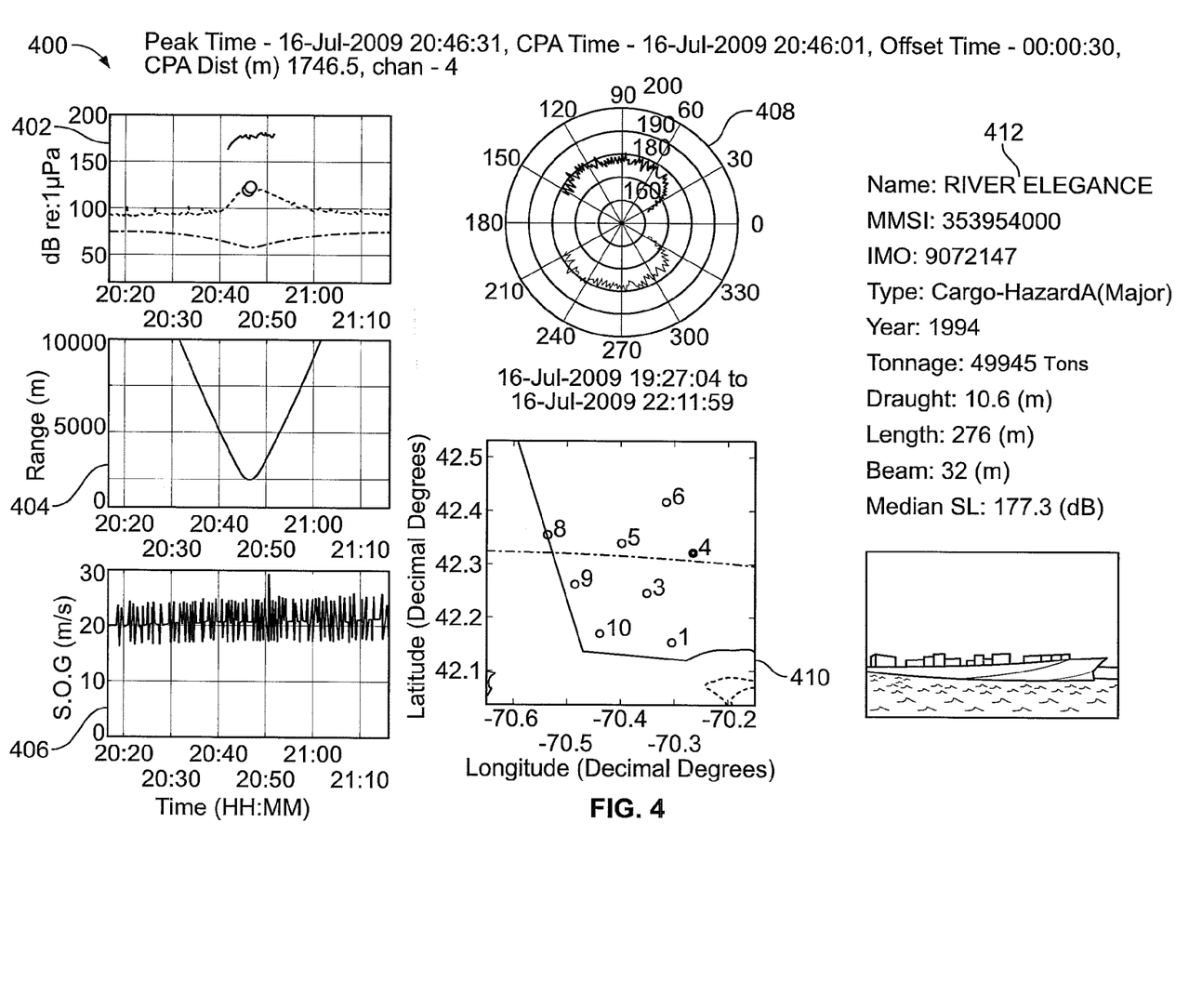
FIG. 4 illustrates an exemplary graphical user interface of a vessel database according to one embodiment of the present invention.

FIG. 4 illustrates an exemplary Graphical User Interface ("GUI") 400 of a vessel database according to one embodiment of the present invention. The GUI includes acoustic receive levels 402, track information or range of the vessel 404, speed of the vessel 406, angular response 408 that is derived from vessel movement 410 in terms of GPS coordinates. The GUI also includes vessel specifications 412 including vessel name, type, tonnage, size, engine type, length, and picture of the vessel.

It is contemplated that the track information may be saved in separate records in order to allow the vessel data to be used independent of its specific track. Kinematic data is not determined for each track-vessel pair. Instead vessels are used based on their category, or size and speed in order to provide a close match to vessel dynamics and modeling of sound propagation without a vehicle kinematic model.

Acoustic modeling is the backbone of the propagation of sound in the water column. To build simulations, a basic model is used to determine transmission loss ("TL"). This basic model includes spherical spreading components (H) and cylindrical spreading components (R), as shown in Equation (2).

$$TL = 10\mathrm{Log}_{10}\left(\frac{H}{1m}\right) + 10\mathrm{Log}_{10}\left(\frac{R}{1m}\right). \quad \text{Equation (2)}$$

Equation (2) has a series of disadvantages, including a lack of temperature profile and other environmental properties such as bathymetry data. However, this basic model provides for rapid development, allowing the ability to visualize animations and empirical information. After the basic model is applied, the Heat Light Sound ("HLS") Acoustic Toolbox is applied to more accurately predict transmission loss. The following models are available in the analysis, $$TL = \mathrm{Model}(i) \quad \text{Equation (3)}$$

where i represents the acoustic model type. Acoustic model types include, for example, Navy Standard PE, Bellhop Acoustic Model, RAM Acoustic Model and Kraken Acoustic Model. Since simulation takes a significant amount of time, processing on a multi-node computer is required. For speed enhancement, the Fortran 77 interface provided through the HLS Acoustic Toolbox may be used.

Integrating spatial and temporal information over large scales of data provides a valuable tool for analyzing the acoustic habitat. Looking at populations of animals, both acute and chronic noise characteristics are taken into account, which can provide information to regulatory and scientific experts. The present invention provides tools to integrate ambient noise levels, anthropogenic sources (vessels) along with animal locations and estimates of populations through calling behavior and location data.

Following is an example including a 90×90 grid of uniformly distributed, hypothetical receivers with a spatial separation of 1 km covered the area in and immediately surrounding the Stellwagen National Marine Sanctuary in the Massachusetts Bay area.

Gridded receive levels are generated for a given area. Sounds from biological signals—one grid for each calling whale referred to as a "sender"—, ambient noise, historic ambient noise and anthropogenic noise for each vessel present in the area are modeled as separate layers. The gridded receive levels are calculated for each time period that is analyzed. For each time period, the receive levels for each sender call is calculated at all receiver locations in the grid. The receive levels are then corrected for the Recognition Differential ("RD"), which is derived from a combination of the ability of the receiver to detect the signal within the noise and the duration and bandwidth characteristics of the sender's signal as well as other factors such as binaural hearing and directivity. The receive levels for the grid are then stored in an m×n×t matrix where m and n define the spatial coordinates and t defines the temporal coordinates.

Present Ambient ("PrA1") is a measure of the noise conditions derived from wind speed. Wind speed measurements from the nearest available oceanographic buoys are regressed with background noise measurements taken with the passive acoustic monitors. For a given period, the wind speed is then used to calculate the ambient noise levels across the grid. The receive level at each grid point has noise added to it based on a random value between −1 and 1, which is multiplied by the standard deviation to emulate natural variation. The Historic Ambient ("HA") grid is derived from the PrA1 grid by subtracting a correction factor in dBs across the grid to represent the historic conditions when there was no contribution from distant anthropogenic sources such as distant shipping.

Figure 5A:
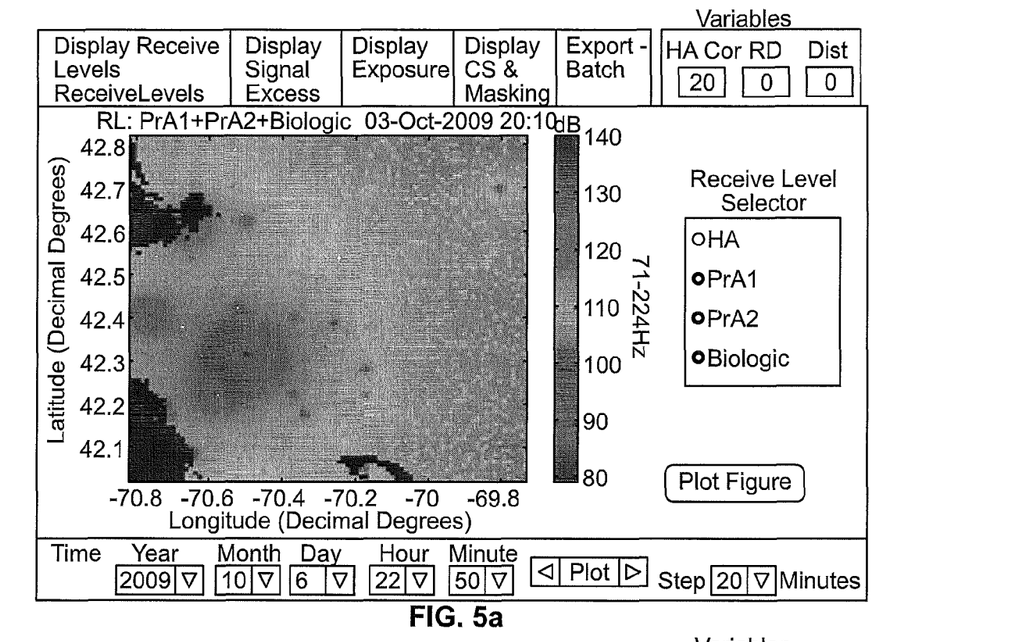
FIGS. 5(a)-5(d) illustrate the various formats of data products of the Acoustic Ecology GUI according to one embodiment of the present invention.

The Anthropogenic Noise Layer ("PrA2") is created from the noise contributions of all the vessel events that are being examined. A separate grid layer is created for each vessel event. The different vessel grids are then summed to produce an overall anthropogenic receive level grid. FIG. 5(a) of the Acoustic Ecology GUI allows these layers to be viewed separately or summed together, for each time period available. Specifically, FIG. 5(a) shows whale receive levels from vessel and other senders including present ambient.

Figure 5B:
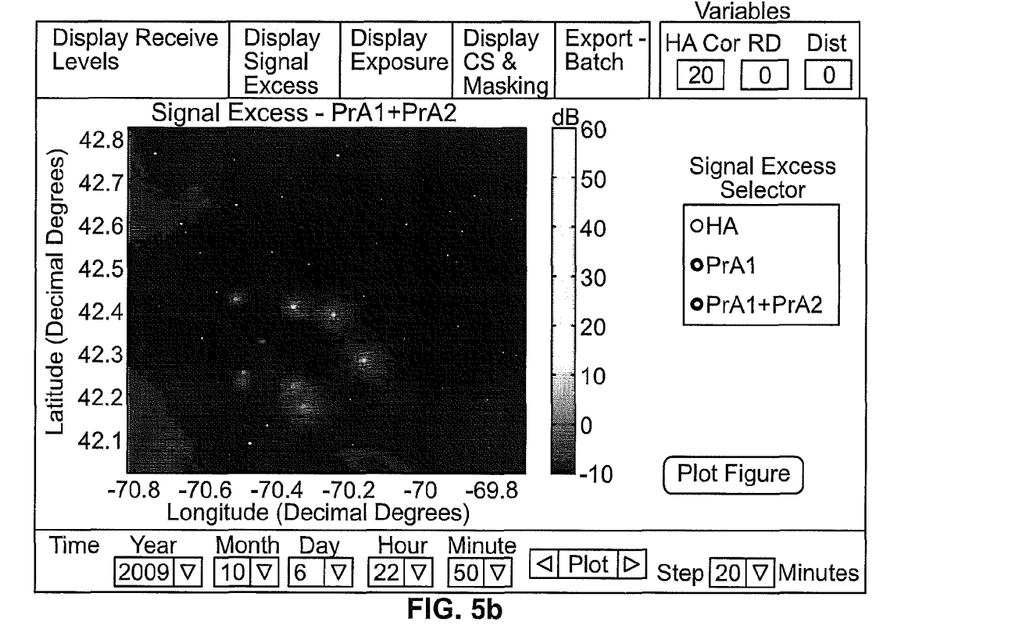

Once all the receive level grids have been created, Signal Excess ("SE") for each of the signals is calculated. In the Acoustic Ecology GUI, the SE is based on the signals contributed from all the sender calls. The SE is calculated from the receive levels corrected for RD from the sender calls minus the ambient or minus the ambient and the anthropogenic noise grids. SE for receivers (whales) can be viewed in FIG. 5(b) of the Acoustic Ecology Viewer. It is also possible to measure which of the sender whales is exposed to acute sound by determining if it is exposed to a user defined dB threshold.

Figure 5C:
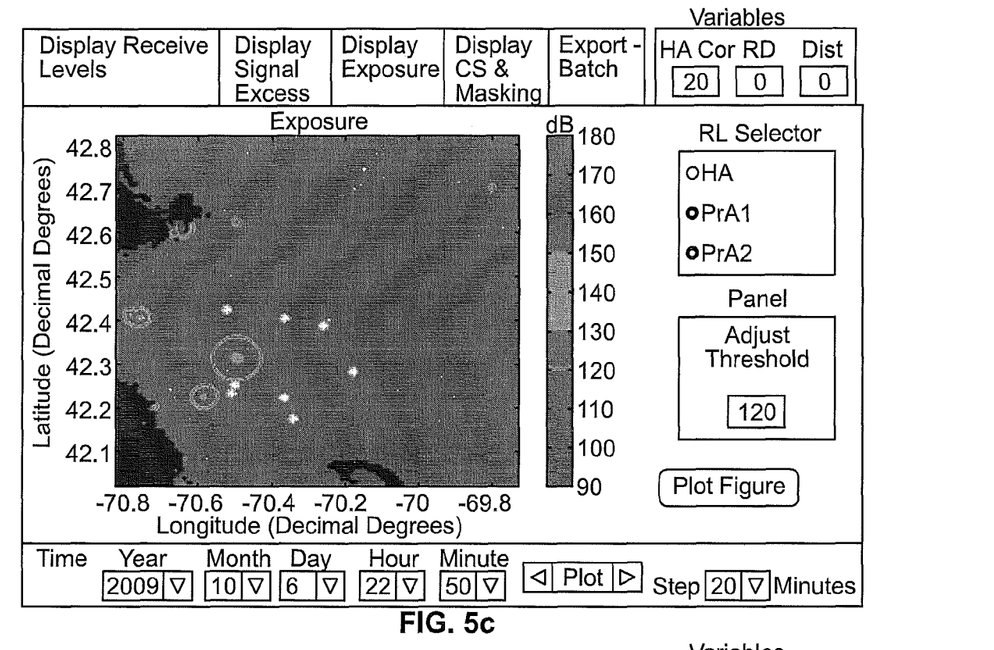

Exposures can be viewed in FIG. 5(c) of the Acoustic Ecology GUI. Specifically, FIG. 5(c) shows the sender whales that would be exposed to levels in excess of 120 dB or any user defined threshold level. Communication Space ("CS") and Masking Metrics ("M") are calculated from the SE grids. For each sender, a sub-selection of the grid is made for receivers that fall within a given radius from the sender. This is the maximum Communication Range ("CR") that the sender would be able to communicate over under historic ambient noise conditions. SE is converted into Potential Communication Space ("PCS"). PCS is calculated for each receiver in CR by multiplying the SE with the PR or probability of recognition function. Each receiver now has a value between 0 and 1, where 0 is 0% probability of detection of the sender and 1 is 100% probability of detection. The PCS values for all the receivers that fall within CR for the sender are summed. This is repeated for all the senders and all are summed together.

Figure 5D:
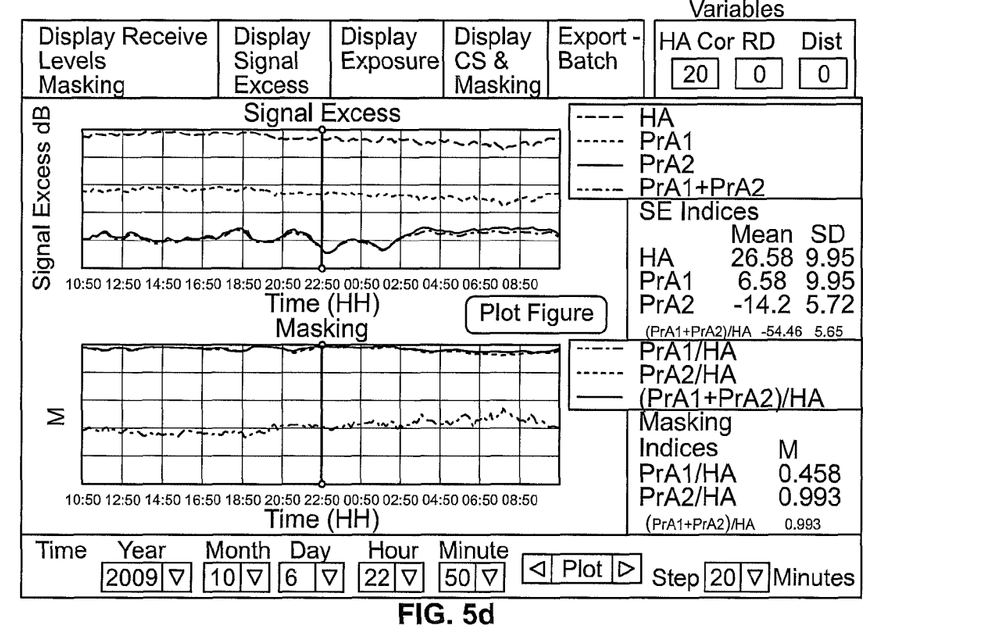

The PCS value for SE based on HA conditions represents the maximum available Communication Space ("$CS_{max}$") under ideal conditions and is the reference value for comparison with contemporary or future conditions. The procedure is repeated for SE based on PrA1, PrA2 and PrA1+PrA2. The ratio of CS for PrA1, PrA2 and PrA1+PrA2 relative to $CS_{max}$ gives the CS metric of $(CS_{MS})_t$. The M for multiple senders is $(M_{MS})_t = (1 - CE_{MS})_t$. FIG. 5(d) illustrates the Signal Excess, Communication Space, and Masking Metrics for a specific time of interest. The HA correction factor, CR and RD can be varied in order to perform a sensitivity analysis of the data.

The Acoustic Ecology GUI shown in FIGS. 5(a)-5(d) also allows for the generation of animations of the RL, SE and exposure grids for a selected period. The Acoustic Ecology GUI shown in FIGS. 5(a)-5(d) is a tool that is able to navigate through, visualize and measure the acoustic habitat for a species of interest in the area of interest in order to measure the potential impact of anthropogenic noise over an ecologically meaningful spatiotemporal area.

To demonstrate the benefits of parallel computing technology, auto-detection-classification and noise analyses are run using the present invention. Results are compared using a series of processing environments. These include a single desktop computer, a 12 node computer running serial (non-parallel) MATLAB software and a 12 node computer running parallel MATLAB. For auto-detection and classification, the number of event reports from the algorithms has a large impact on performance. To achieve baseline data, Fin Whale and North Atlantic Right Whale ("NARW") detection software was run. The Fin Whale detector uses a template based detection process referred to as "Template" detection. The NARW uses a three-stage detection feature extraction and classification process referred to as "Classifier" detection. Massachusetts Bay PAM data was used in the benchmark, which contains 19 channels of audio sampled at 2 kHz for 60 days.

The noise analyzer processes small sections of data. If sections of data were read separately from the disk, the overhead for disk Input/Output ("I/O") would limit the throughput of the analyzer. To avoid this limitation, data files are mapped into Random Access Memory ("RAM") so that reading each data portion after reading the first portion essentially becomes a memory access task. The second benchmark is to measure noise analysis processing. As with auto-detection, three different computer configurations were selected. The processing of noise analysis only depends on the resolution of the audio data. The runtime performance is summarized in two formats. Table I below shows the execution time to process auto-detection and noise analysis. This performance is measured in hours.

TABLE I

COMPUTE TIME, AUTO-DETECTION AND NOISE ANALYSIS

| Process | Desktop Computer[1] | Server (serial) | 8 Node Server (parallel) |
| --- | --- | --- | --- |
| Detection - Template | 11 hours | 8 hours | 2.4 hours |
| Detection - Classifier | 131 hours | 44 hours | 6.7 hours |
| Noise Analysis | 20 hours | 5 hours | 1.0 hours |

[1]Non Optimized Code

Table II below shows the rate of execution.

TABLE II

COMPUTE RATES, AUTO-DETECTION AND NOISE ANALYSIS

| Process | Desktop Computer[1] | Server (serial) | 8 Node Server (parallel) |
| --- | --- | --- | --- |
| Detection - Template | 2490 x | 3420 x | 11,400 x |
| Detection - Classifier | 209 x | 622 x | 4,084 x |
| Noise Analysis | 1368 x | ~5,472 x | ~27,360 x |

[1]Non Optimized Code

The rate of execution is an integer, which represents the number times relative to real-time at which the process is executed. From the data provided in Tables I and II above, desktop computers are benchmarked using optimized and non-optimized code. Generally, non-optimized software modules are created so that the first step is to optimize the software. Once optimized, the code executes faster and more efficiently. Optimized versions are used on the high performance server. In order to measure the performance improvement by HPC enhancements to the software code, benchmarking code is built into the system. The code is used to measure the time to process the files, the size of the files used, and the size of the output. Using MATLAB's profiler code allows the detection of the specific parts of the code that are the bottlenecks in the process. The sound files are generally stored as multi-channel data files, which provide for sufficient data organization and are also useful for other software that utilizes multi-channel data, for example, to geo-locate a whale call using time-delay information across the sensors. For purposes of storage of the output, it becomes better to store the data as single sensor files of a day's duration since this is the most practical period for running analysis and visualization tools. The splitting of sound by channels allows for the parallelizing of the process by distributing the computing task across channels to take advantage of multi-core processing and parallel solutions by splitting the process across servers/computer clusters.

Integrating various scales of data provides a powerful ability for analysis and interpretation. The present invention includes two different scales for viewing data and assessing acoustic habitat and environmental factors. The first scale demonstrates the ability to detect calling behavior such as odontocete whale clicks over long periods of time. The second scale demonstrates the impacts of anthropogenic noise sources and how these overlap with the communication space for various whale species including, for example, fin whale, humpback whale and right whale.

Many whale species tend to move in large groups that are often distributed over large ocean areas, and knowing when animals are present in a given area is important information. Oceanographic measures contain both spatial and temporal information, where many sensors may be required to provide accurate surveillance of an area. Furthermore, both auto-detection and noise analysis processes are improved by the inclusion of important parameters regarding spatial and temporal information. Being able to determine when the animals are calling coincident with background noise conditions is especially informative.

To demonstrate the ability to visualize large data sets, a sensor with 119 days of acoustic data was selected. The deployment was located off the coast of Africa, and the PAM sensors were MARUs. After the units were collected and time aligned, sound libraries were staged on the HPC server. Dolphin click detection algorithms were run on the data, and the standard output from the detectors reported time-stamped call counts.

Figure 6:
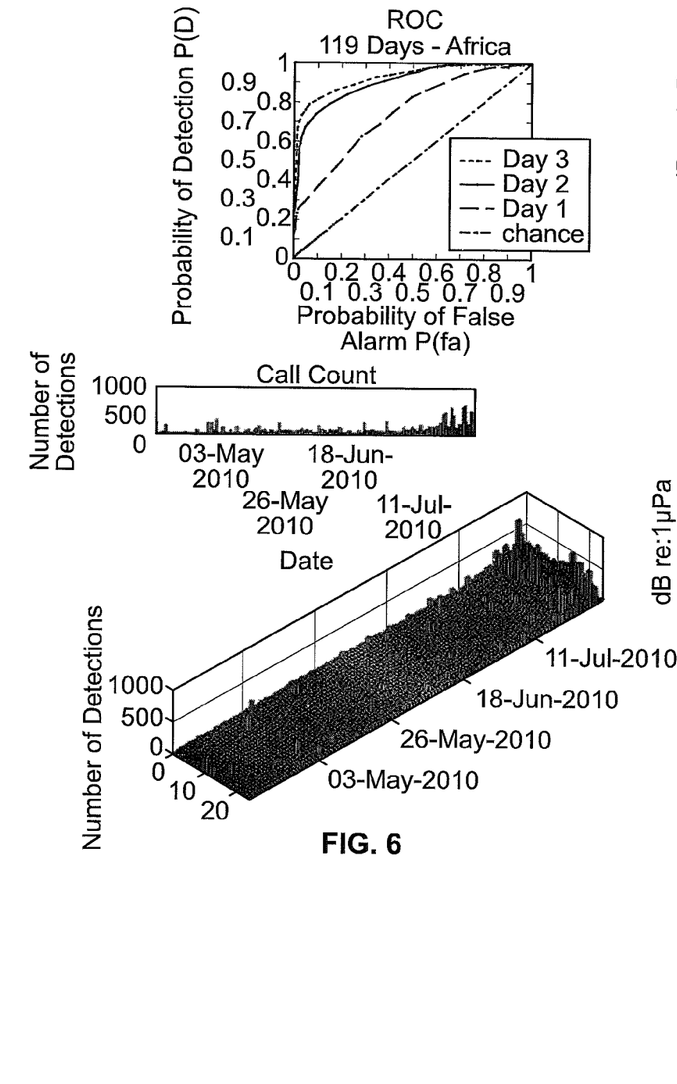
FIG. 6 illustrates a call count bar graph according to one embodiment of the present invention.

FIG. 6 illustrates a call count bar graph. Specifically, FIG. 6 illustrates the call counts from the click detector for a single sensor for 24 hours versus 119 days of observation. The graph is generated by auto-detection software. Accuracy of the software is checked using the Receiver Operator Characteristic ("ROC") graph, where three days are assigned ground truth, and accuracy is measured against auto-detection performance.

Figure 7:
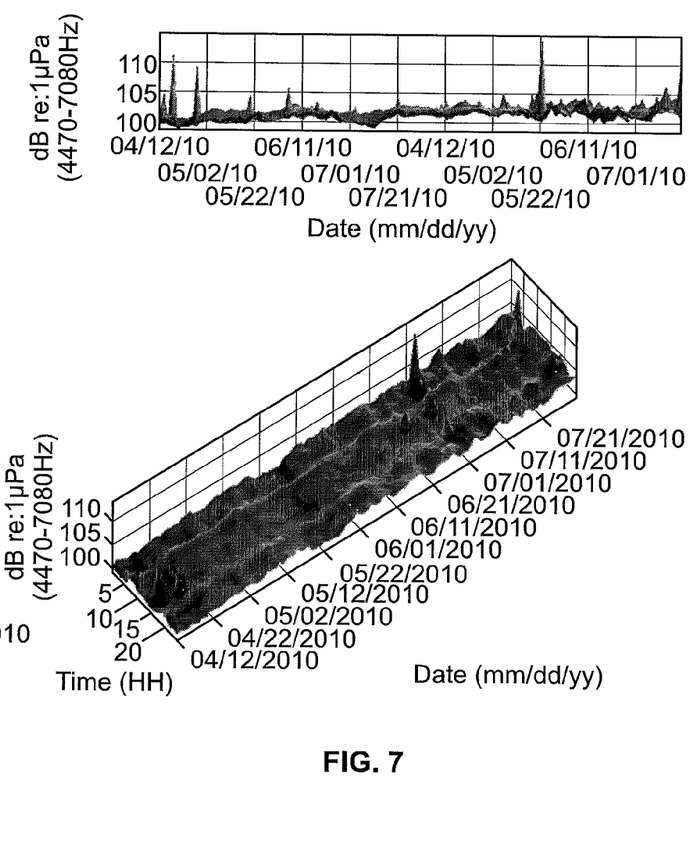
FIG. 7 illustrates a noise analysis waterfall plot according to one embodiment of the present invention.

To better understand ambient conditions, noise analysis was also run on the same acoustic data as shown in FIG. 7. Specifically, FIG. 7 illustrates a noise analysis waterfall plot for 24 hours versus 119 days of observation. The graph is generated by noise analysis software. There is a slight increase in noise activity during the last portion of the deployment. For the most part, noise peaks are not correlated with the auto-detection, indicating the two processes work independent of each other. Therefore, the click detectors have a high noise rejection translating to less false positives.

The results presented in FIG. 6 and FIG. 7 are generated in a series of steps. First, the click detection algorithms are run on the sound data, with the metadata stored for each day in the deployment. Detection information, such as event time, frequency and noise levels are recorded and cataloged into MATLAB files. Then, a series of days is sampled where ground truth information is provided. Ground truth information provides accurate markings for the time and frequency bounds collected by the automatic detection software. Ground truth information is integrated with detection results to build the ROC curves shown in the upper left of FIG. 6. Based on the ROC results, an operational threshold is selected, and the complete call count graph is generated by extracting samples from the MATLAB files. In the embodiment shown in FIG. 6, the operational threshold is 0.65, but any operational threshold is contemplated. To help in visualization, the three-dimensional call count graph is reduced to two axes shown in the upper right of FIG. 6. The call count graph shows the call counts versus deployment date.

Ambient noise plays a significant role in understanding the acoustic environment. FIG. 7 shows the temporal map of the long-term spectrograms for the upper frequency band (4470 Hz-7080 Hz). This band is the primary band for the click sounds. For the most part, the ambient noise is steady with the exception of various peaks located around Apr. 12, 2010 and May 24, 2010. Comparing both the call count and the ambient noise, the calling activity is relatively steady from the beginning of the deployment through Jul. 14, 2010, at which point there is a sharp increase in odontocete clicks.

Figure 8A:
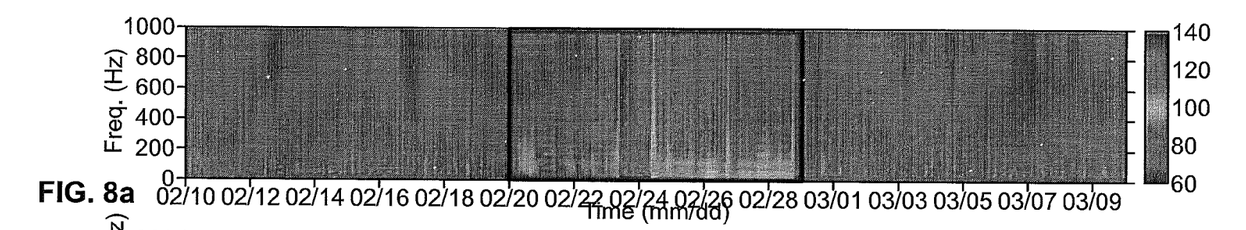
FIGS. 8(a)-8(d) illustrate the different views of the sample noise analysis according to one embodiment of the present invention.
Figure 8B:
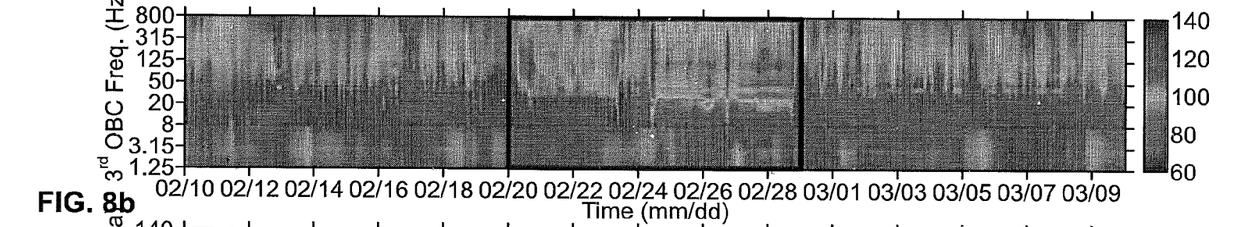
Figure 8C:
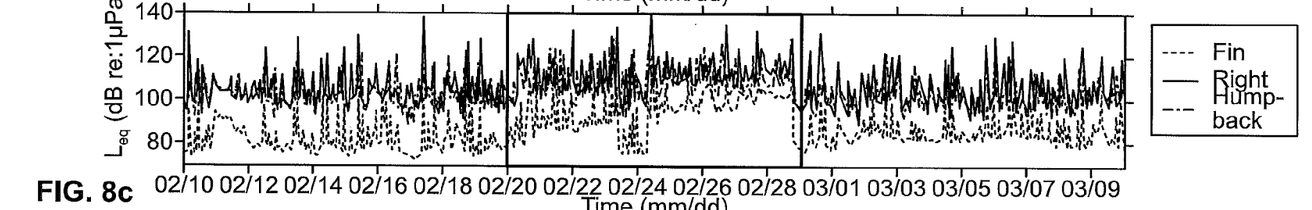
Figure 8D:
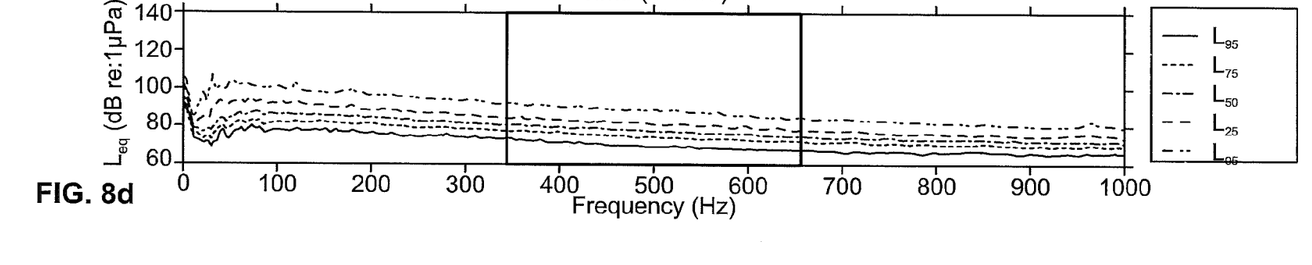
Figure 9A:
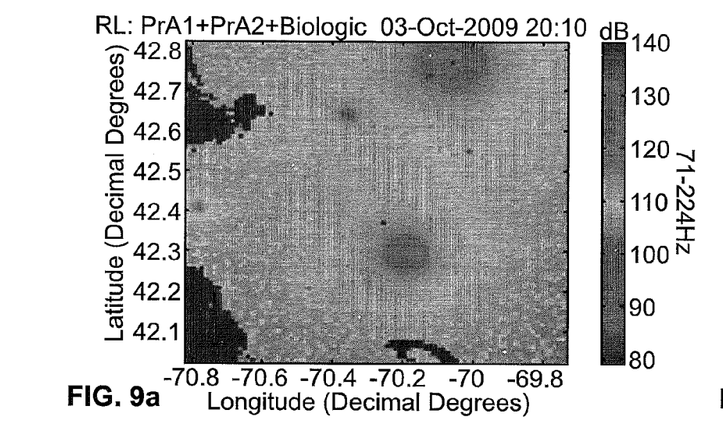
FIG. 9 illustrates the generated visualizations according to one embodiment of the present invention.
Figure 9B:
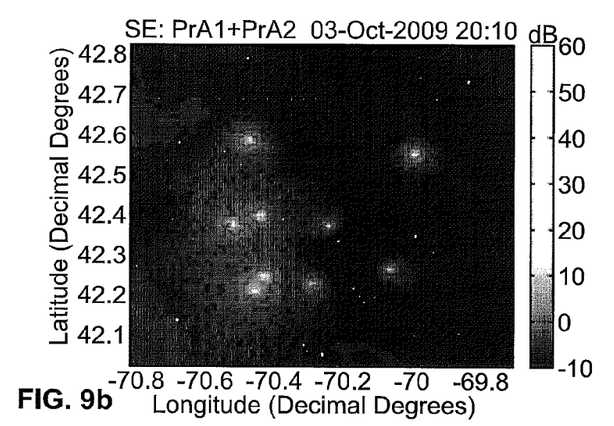
Figure 9C:
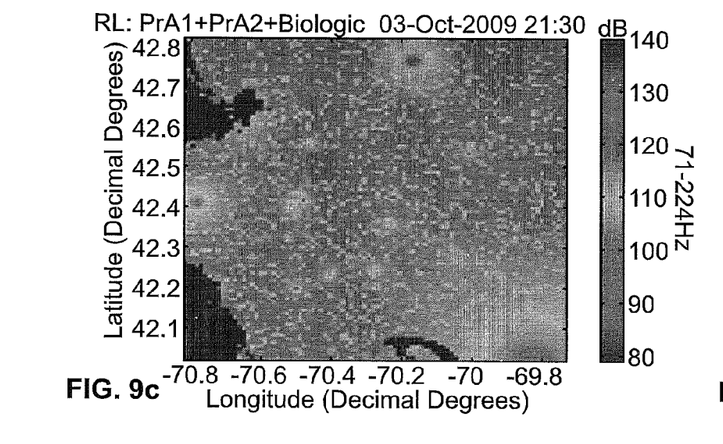
Figure 9D:
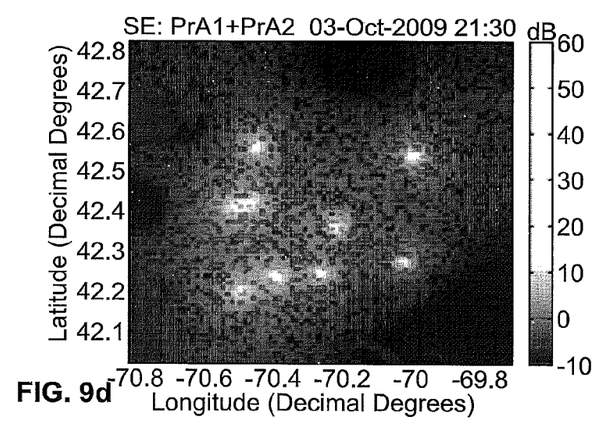

FIGS. 8(a)-8(d) illustrate the different views of the sample noise analysis according to one embodiment of the present invention. Specifically, FIGS. 8(a)-8(d) illustrate a second visual example where ambient noise, vessel activity and whale frequency band information is superimposed on a common axis. These figures show data taken from Massachusetts Bay, with a sample rate of 2 kHz and a deployment length of 30 days. FIG. 8(a) is a long-term spectrogram, which displays the matrix of Root-Mean-Square ("RMS") values converted to dB across frequency and time. Specifically, FIG. 8(a) shows a spectrogram with a sample cutoff at 1000 Hz. FIG. 8(b) shows the third-octave spectrogram where the acoustic object is more defined. Specifically, FIG. 8(b) illustrates a $\frac{1}{3}^{rd}$-octave band RMS display, which is a fixed series of frequency bands based on a logarithmic progression, and in which frequency bandwidth doubles every octave. FIG. 8(c) shows three different band levels for three different whale species as an RMS value, which is the sum of the $\frac{1}{3}^{rd}$-octave band that encompass the frequency bands of communication for the given species. Specifically, whale bands in FIG. 8(c) show an increase in sound intensity for the corresponding time period for the fin whale, humpback whale and right whale species. These are essentially spectrum statistics, which is the equivalent noise power located in a frequency band of primary sound production for these three species. FIG. 8(d) shows a quartile representation, and the dark box shows vessel activity over a 9 day period. Specifically, FIG. 8(d) shows the spectrum statistics, which provide information on the distribution of energy across the duration of the sound for each frequency band of the spectrogram. The distribution is expressed in terms of percentiles. For example, L05 represents the level at which the top 5% of the sound measures have the frequency response as shown in FIG. 8(d).

In FIGS. 8(a)-8(c), a black outlined box represents a period with vessel activity that occurred between a specific date—February $2^{nd}$ and $29^{th}$. During this time the intensity in the spectrogram of FIG. 8(a) shows intensity levels between 100 to 120 dB. The $\frac{1}{3}^{rd}$-octave band displays a finer resolution, indicating an increase in the amount of time that levels exceed 120 dB. The frequency of the vessel is broadband and therefore impacts the whale band layers shown in FIG. 8(c) as an increase in sound energy over the time period.

FIG. 9 provides visualizations generated from the Acoustic Ecology GUI of communication space metrics for a group of 9 Minke whales producing pulse trains. The period of study was one week, during which there were 82 unique large vessels transiting through the region. In addition, there was an average of 120 fishing vessels per day and 5 whale watching vessels per day. The average SL of the calls were determined to be 163 dB with a SD of +/−3.9 dB, the bandwidth of the pulse train was within the set of third octave bands bounded by 63-315 Hz. The figures in the left column represent receive levels from a group of 9 Minke whales, ambient, and vessel noise. The figures in the right column display the SE for the same periods. The figures in the top row of FIG. 9 show a period when two large vessels dominate the acoustic data with high source levels. The right figure of the top row shows that the area of positive SE is reduced to the areas just surrounding each individual sender whale. In the second row of FIG. 9, at 01:20 hours and minutes later, the last of the large vessels is exiting the area towards the southeast quadrant of the grid space. The right figure of the middle row shows that the positive SE has significantly expanded around each of the sender whales. Specifically, the area of SE has more than doubled in range. In the bottom row of FIG. 9, there are no significantly loud vessels in the area. Specifically, 03:30 hours and minutes later, the majority of the grid area appears to be in positive SE as shown in the right figure of the bottom row.

Figure 10:
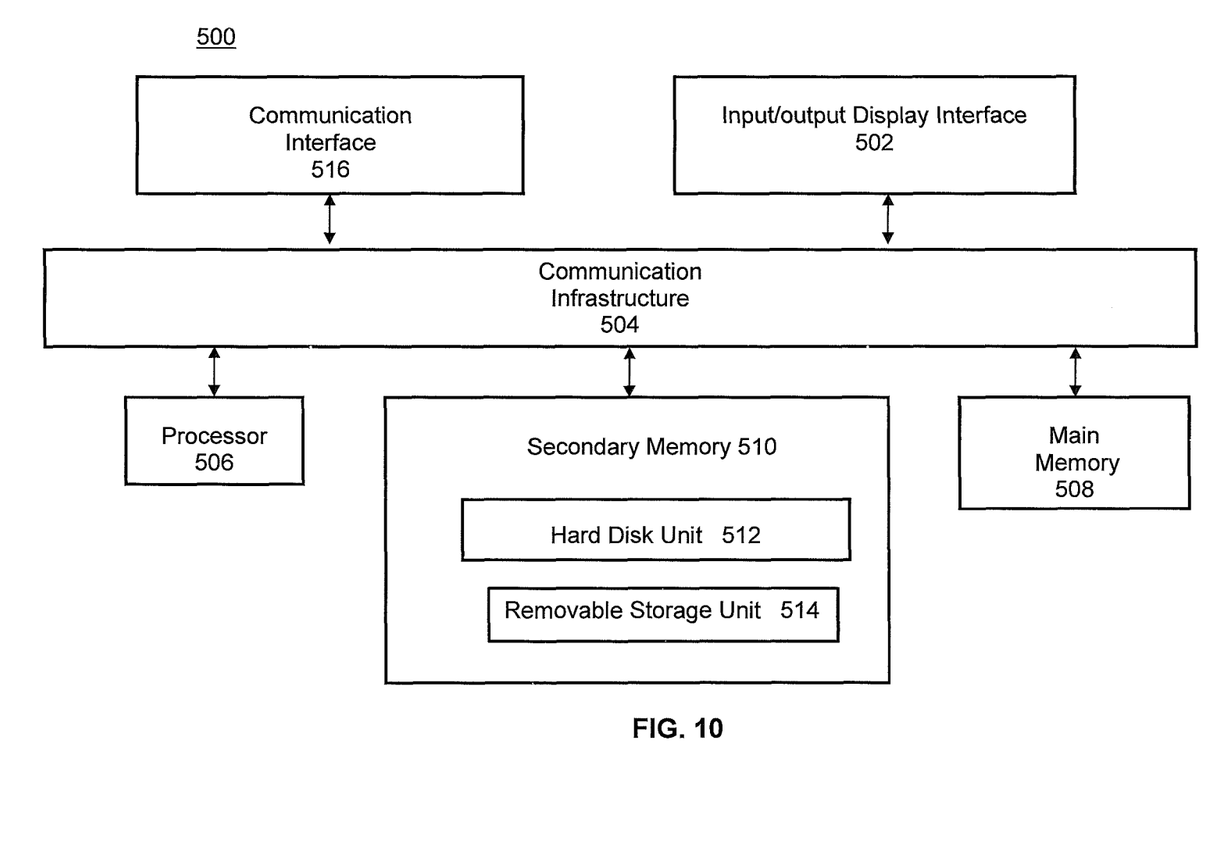
FIG. 10 illustrates an exemplary computer system that may be used to implement the present invention.

FIG. 10 illustrates an exemplary computer system 500 that may be used to implement the present invention. However, it is contemplated that more than one computer system 500 may carry out the present invention.

Computer system 500 includes an input/output display interface 502 connected to communication infrastructure 504—such as a bus—, which forwards data such as graphics, text, and information, from the communication infrastructure 504 or from a frame buffer (not shown) to other components of the computer system 500. The input/output display interface 502 may be, for example, a keyboard, touch screen, joystick, trackball, mouse, monitor, speaker, printer, any other computer peripheral device, or any combination thereof, capable of entering and/or viewing data.

Computer system 500 includes one or more processors 506, which may be a special purpose or a general-purpose digital signal processor that processes certain information. Computer system 500 also includes a main memory 508, for example random access memory ("RAM"), read-only memory ("ROM"), mass storage device, or any combination thereof. Computer system 500 may also include a secondary memory 510 such as a hard disk unit 512, a removable storage unit 514, or any combination thereof. Computer system 500 may also include a communication interface 516, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 508, secondary memory 510, communication interface 516, or a combination thereof, function as a computer usable storage medium, otherwise referred to as a computer readable storage medium, to store and/or access computer software including computer instructions. For example, computer programs or other instructions may be loaded into the computer system 500 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 514 or hard disc unit 512 to the secondary memory 510 or through the communication infrastructure 504 to the main memory 508 of the computer system 500.

Communication interface 516 allows software, instructions and data to be transferred between the computer system 500 and external devices or external networks. Software, instructions, and/or data transferred by the communication interface 516 are typically in the form of signals that may be electronic, electromagnetic, optical or other signals capable of being sent and received by the communication interface 516. Signals may be sent and received using wire or cable, fiber optics, a phone line, a cellular phone link, a Radio Frequency ("RF") link, wireless link, or other communication channels.

Computer programs, when executed, enable the computer system 500, particularly the processor 506, to implement the methods of the invention according to computer software including instructions.

The computer system 500 described herein may perform any one of, or any combination of, the steps of any of the methods presented herein. It is also contemplated that the methods according to the invention may be performed automatically, or may be invoked by some form of manual intervention.

The computer system 500 of FIG. 10 is provided only for purposes of illustration, such that the invention is not limited to this specific embodiment. It is appreciated that a person skilled in the relevant art knows how to program and implement the invention using any computer system.

The computer system 500 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

The described embodiments above are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

What is claimed is:

1. A system to determine chronic and acute impacts on communication space, comprising:
   a distributed network of sensors forming a grid, each sensor recording acoustic data for a species of interest in an area of interest defined by the grid, wherein each sensor obtains acoustic data at a predetermined sample rate and a bit depth;
   a database including vessel data comprising Global Positioning System ("GPS") coordinates for a vessel throughout a range from a first point to a second point within the grid and a speed of the vessel;
   one or more buoys providing wind speed data;
   a processor in communication with and associated with each sensor of the distributed network of sensors, the database, and the one or more buoys, the processor analyzing the acoustic data, the vessel data, and the wind speed data, the analysis comprising the step of modeling noise layers;
   a display to visualize the noise layers and measure an acoustic habitat for the species of interest in the area of interest to assess a potential impact of anthropogenic noise.

2. The system to determine chronic and acute impacts on communication space according to claim 1, wherein an angular response of each vessel is computed from the vessel data.

3. The system to determine chronic and acute impacts on communication space according to claim 1, wherein the acoustic data includes acute and chronic noise characteristics of animals determined through receive levels for each animal call, animal locations and estimates of animal population determined through calling behavior and location data.

4. The system to determine chronic and acute impacts on communication space according to claim 1, wherein the sample rate is limited by the maximum frequency of the species of interest.

5. The system to determine chronic and acute impacts on communication space according to claim 1, wherein the bit depth is used to determine a dynamic range over which the acoustic data can be measured, the dynamic range being the difference between the maximum value that can be recorded and the minimum value that can be recorded.

6. The system to determine chronic and acute impacts on communication space according to claim 1, wherein the noise layers comprise a matrix layer, a present ambient layer, a historic ambient layer, an anthropogenic layer.

7. The system to determine chronic and acute impacts on communication space according to claim 6, wherein the matrix layer consisting of a m×n×t matrix where m and n each define spatial coordinates and t defines a temporal coordinate of the acoustic data.

8. The system to determine chronic and acute impacts on communication space according to claim 6, wherein the present ambient layer comprising wind speed data.

9. The system to determine chronic and acute impacts on communication space according to claim 6, wherein the historic ambient layer comprising data resulting from a subtraction of a correction factor in dBs from the present ambient layer.

10. The system to determine chronic and acute impacts on communication space according to claim 6, wherein the anthropogenic layer comprising the vessel data.

11. The system to determine chronic and acute impacts on communication space according to claim 1, wherein the step of modeling noise layers further comprises the step of determining signal excess for each signal of the acoustic data.

12. The system to determine chronic and acute impacts on communication space according to claim 11, wherein the step of determining signal excess for each signal of the acoustic data further comprises the steps of: providing a matrix layer, a present ambient layer and a historic ambient layer, the matrix layer consisting of a m×n×t matrix where m and n each define spatial coordinates and t defines a temporal coordinate of the acoustic data, the present ambient layer comprising wind speed data, and the historic ambient layer comprising data resulting from a subtraction of a correction factor in dBs from the present ambient layer; and
    subtracting both the present ambient layer and the historic ambient layer from the matrix layer.

13. The system to determine chronic and acute impacts on communication space according to claim 12, further comprising the steps of:
    providing an anthropogenic layer comprising the vessel data; and
    subtracting each of the present ambient layer, the historic ambient layer, and the anthropogenic layer from the matrix layer.

14. A system for acoustic monitoring, comprising:
    a database including vessel data;
    one or more sensors recording acoustic data;
    a memory;
    a display connected to the memory; and
    a plurality of processors connected to the memory and the database;
    the plurality of processors using a plurality of parameters to perform noise analysis on the data, wherein the noise analysis includes the measurement of an acute noise level and a chronic noise level and the plurality of parameters includes species vocalizations to determine animal location, ambient noise integrated over at least one of a temporal scale and a spatial scale to characterize sound, environmental factors including ocean conditions and vessel location, wherein the ambient noise includes present ambient noise and historic ambient noise determined from wind speed;
    the plurality of processors further configured to generate an animated data visualization of noise layers to display a potential impact of anthropogenic noise on the display, the noise layers comprising a matrix layer, a present ambient layer, a historic ambient layer, an anthropogenic layer.

15. The system for acoustic monitoring according to claim 14, wherein the acoustic data is recorded at a predetermined sample rate and a bit depth and each sensor is in communication with one processor of the plurality of processors.

16. The system for acoustic monitoring according to claim 14, wherein the vessel location is determined from Global Positioning System ("GPS") coordinates.

17. The system for acoustic monitoring according to claim 14, wherein the wind speed is obtained from the nearest available oceanographic buoys.

18. The system for acoustic monitoring according to claim 14, wherein the animated data visualization includes calling behavior of the species.

19. The system for acoustic monitoring according to claim 14, wherein the plurality of processors further compute various metrics such as receive levels, signal excess, masking and communication space over at least one of the temporal scale and the spatial scale.

* * * * *